May 17, 1960 F. D. SAWYER 2,936,562
FRAME STRUCTURE FOR TRACTOR-MOUNTED CROP HARVESTER
Filed Aug. 5, 1957 3 Sheets-Sheet 1
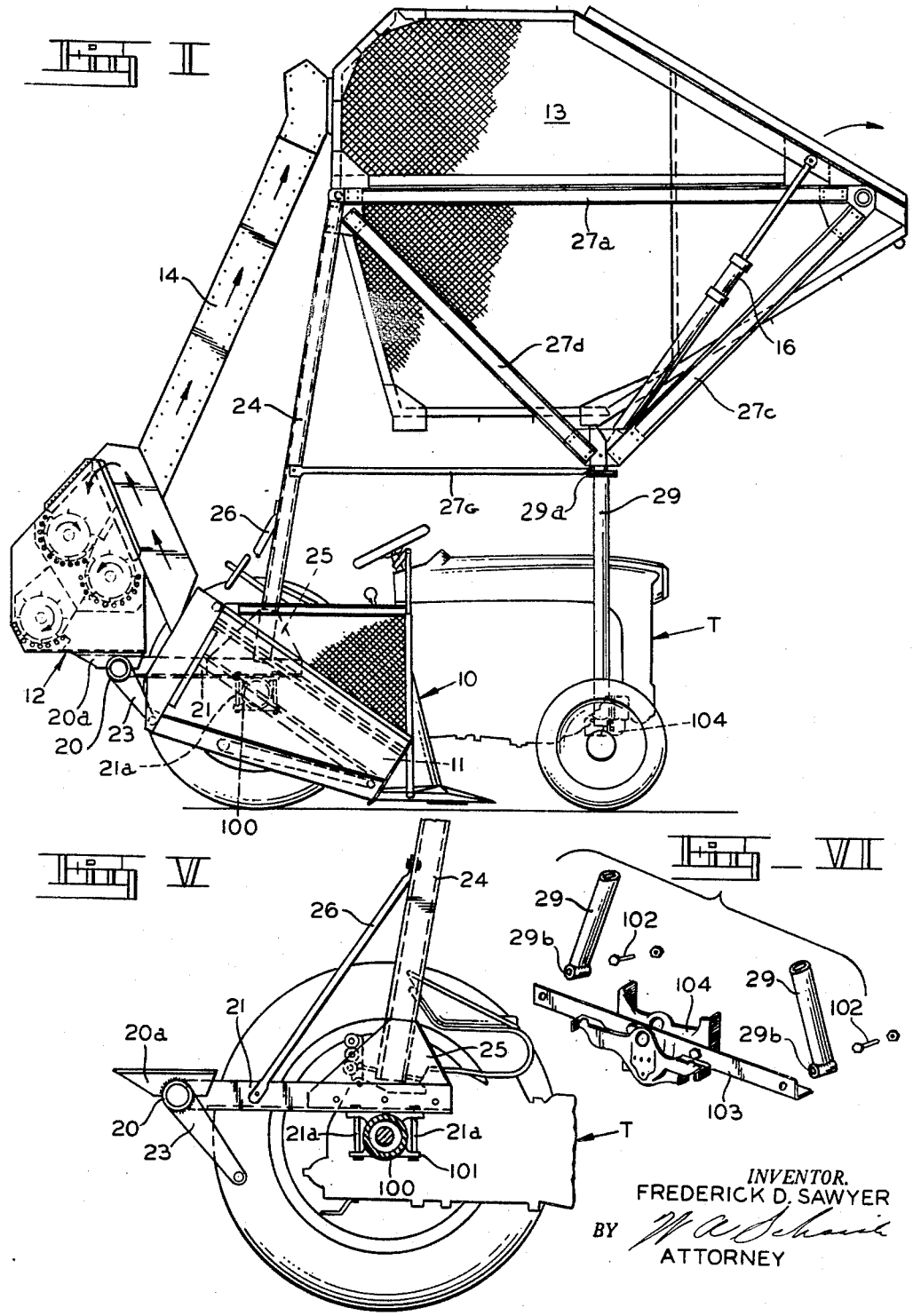
INVENTOR.
FREDERICK D. SAWYER
BY
ATTORNEY

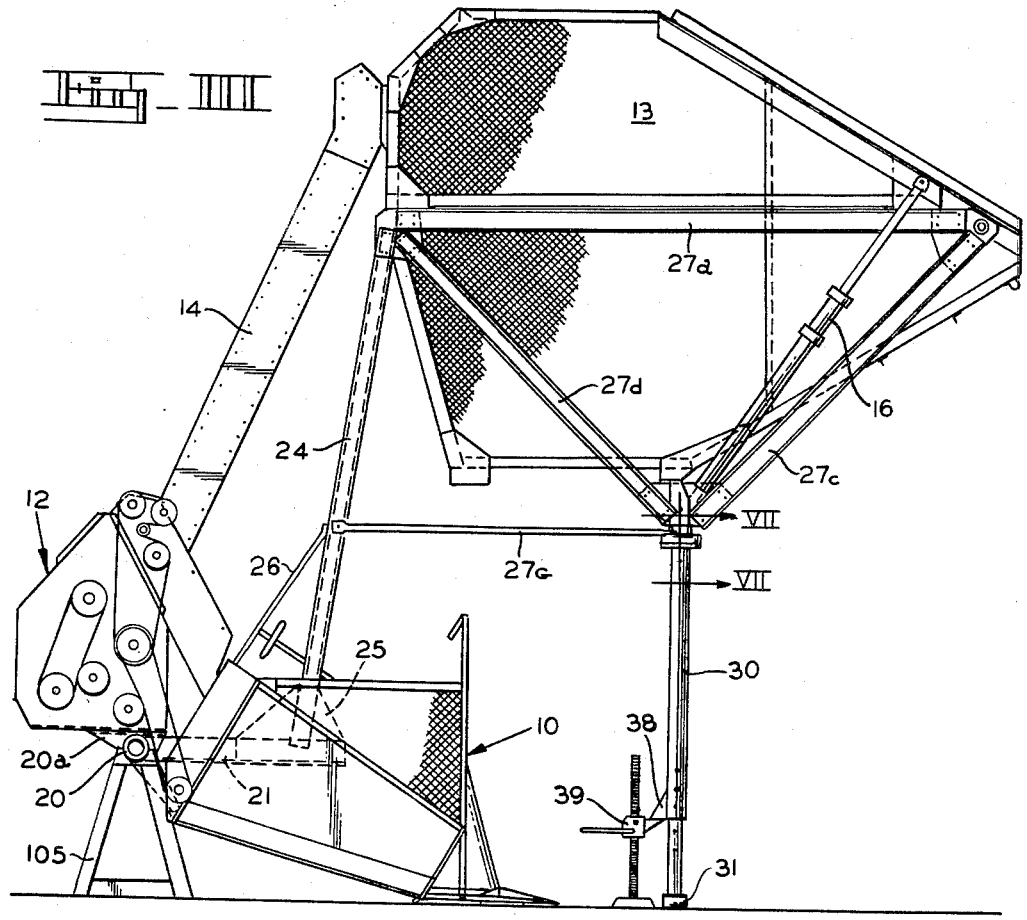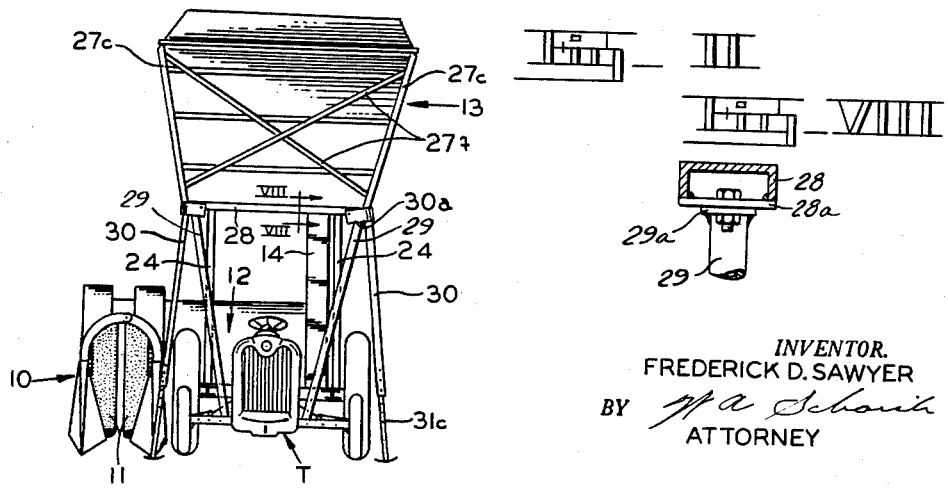

May 17, 1960 F. D. SAWYER 2,936,562
FRAME STRUCTURE FOR TRACTOR-MOUNTED CROP HARVESTER
Filed Aug. 5, 1957 3 Sheets-Sheet 3
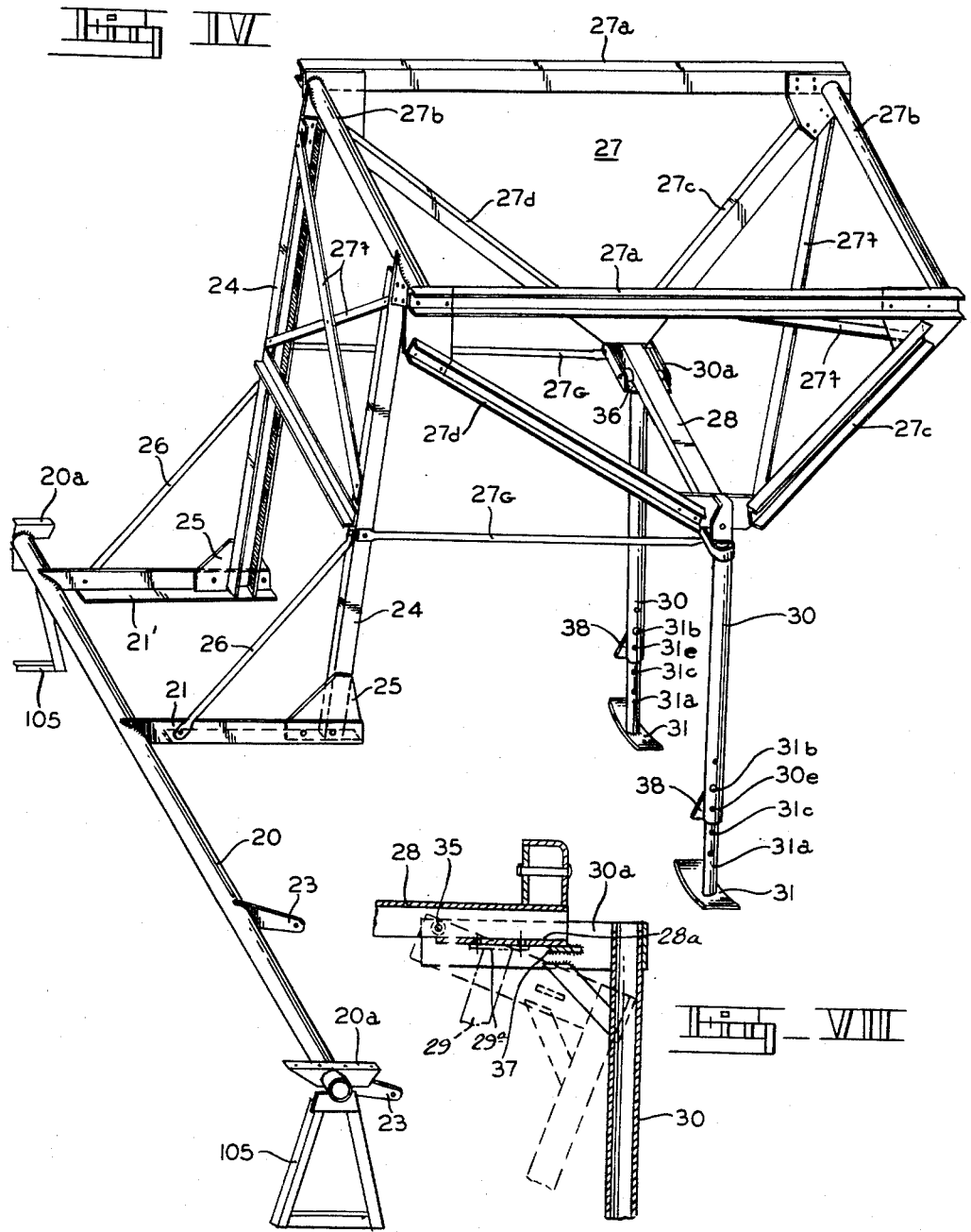
INVENTOR.
FREDERICK D. SAWYER
BY
ATTORNEY United States Patent Office 2,936,562
Patented May 17, 1960

2,936,562

FRAME STRUCTURE FOR TRACTOR-MOUNTED CROP HARVESTER

Frederick D. Sawyer, Birmingham, Mich., assignor of twenty-five percent to Wilbur A. Schaich, Maumee, Ohio Application August 5, 1957, Serial No. 676,185

3 Claims. (Cl. 56—14)

This invention relates to a tractor-mounted crop harvester, and more particularly to an improved frame structure for a cotton harvester permitting the convenient attachment or detachment of the harvester with respect to the tractor.

Tractor-mounted cotton harvesters have become increasingly common in recent years and, in one form thereof, have comprised a plant contacting harvesting unit disposed at one lateral side of the tractor and a collecting basket for the harvested cotton carried in an elevated position above the tractor. While this arrangement provides for efficient mounting of the harvester unit on the tractor, heretofore much difficulty has been encountered in effecting the assemblage and detachment of the harvester unit relative to the tractor. To make such a harvester unit economically feasible for the smaller cotton farmer, it should be capable of being quickly and conveniently attached to or detached from the tractor so the tractor will not be tied up throughout the cotton harvesting season.

Accordingly, it is an object of this invention to provide an improved frame structure for a tractor-carried crop harvester. A particular object of this invention is to provide a frame structure for a cotton harvester unit which will permit the unit to be readily attached to, or detached from the tractor. More particularly, it is an object of this invention to provide a "drive in" frame construction for a tractor-mounted crop harvester unit so that the attachment thereof to the tractor may be accomplished by the tractor operator without additional manual assistance.

The specific nature of this invention, as well as other objects and advantages thereof, will become apparent to those skilled in the art from the following detailed description, taken in conjunction with the annexed sheets of drawings, on which, by way of preferred example only, is illustrated an embodiment of this invention.

On the drawings:

Figure 1 is a side elevational view of a cotton harvester embodying this invention shown in assembled relationship to a tractor.

Figure 2 is a reduced scale, front elevational view of the cotton harvester of Figure 1 with the front end thereof supported on its ground support posts preliminary to mounting on or dismounting from the tractor.

Figure 3 is a side elevational view of the harvester unit of Figure 1 shown in its storage condition, when detached from the tractor.

Figure 4 is an enlarged perspective view of the frame structure of the cotton harvester of Figures 1–4.

Figure 5 is an enlarged scale partial side elevational view, with parts broken away and shown in section, showing the attachment of the harvester frame to the tractor rear axle housing.

Figure 6 is an exploded perspective view illustrating the connection of the cotton harvester frame to the front end of the tractor.

Figure 7 is an enlarged sectional view taken on the plane VII—VII of Fig. 3, illustrating the manner of connection of the ground-engaging support posts to the cotton harvester frame.

Fig. 8 is an enlarged sectional view taken on the plane VIII—VIII of Fig. 2.

Referring particularly to Figures 1–3, a crop harvester embodying this invention includes a plant-contacting harvesting unit 10 which, in the case of a cotton harvester, incorporates stripping brushes or rollers 11 for stripping cotton bolls from the plants. The stripped cotton is conveyed by conventional apparatus to a cotton-cleaning unit 12 mounted rearwardly of the harvester unit 10 and extending across the full width of the tractor A. A crop collecting basket 13 is mounted in an overlying position with respect to the tractor T, and the cleaned cotton is deposited in such basket by a conveyer 14. This general arrangement will not be described in more detail, since this invention relates particularly to the frame structure upon which all of the heretofore described elements are carried.

Referring particularly to Figure 4, the improved frame structure for the crop harvester unit includes a rear transverse tubular beam 20 which has a pair of laterally spaced forwardly extending angle beams 21 and 21' rigidly secured thereto adjacent one end. The free ends of the angle beams 21 and 21' are secured by bolts 21ᵃ to the conventional pads 101 that are commonly provided on the tractor rear axle housing 100. Tubular beam 20 projects laterally beyond one side of the tractor T, here shown as the right-hand side, a substantial distance, and a pair of laterally spaced brackets 23 are provided on such projecting portion. Brackets 23 are utilized to mount the plant-contacting harvesting unit 10. The cotton cleaner unit 12 heretofore mentioned is carried on the full length of the tubular beam 20, being supported on welded angle brackets 20ᵃ at each end of beam 20.

At the forward ends of the angle beams 21, a pair of upright channels 24 are provided, being rigidly secured to angle beams 21 by gusset plates 25 and braced by inclined rods 26. A generally box-shape forwardly projecting articulated frame structure 27 is rigidly built up upon the top portions of channel uprights 24, including a forward transverse beam 28, which is normally disposed in a position overlying the front end of the tractor. Thus frame structure 27 includes top longitudinal horizontal members 27ᵃ, which are joined at their forward and rear extremities by tubular members 27ᵇ. Channels 27ᶜ connect the forward tubular member 27ᵇ to the transverse beam 28. Inclined channels 27ᵈ are provided for additional bracing, as are brace rods 27ᶠ and 27ᵍ. The forward tubular frame element 27ᵇ may be conveniently utilized to provide a hinge for supporting the cotton basket 13. Basket 13 is reciprocated about such pivotal mounting by an hydraulic cylinder unit 16.

To support the overhanging frame structure 27, a pair of support posts or columns 29 are provided, each of which has a horizontal plate portion 29ᵃ (Figure 7) secured to its top end and adapted to be bolted to a plate 28ᵃ welded to the bottom of the front transverse beam 28. The lower ends of support post 29 have bushings 29ᵇ (Fig. 6) welded thereto which are traversed by suitable bolts 102 which respectively engage holes provided in opposed ends of an angle iron 103, which is in turn bolted to a bracket 104 which bolts onto the front end of the tractor engine housing in conventional fashion. Hence, by removal of the bolted connections at both the top and bottom ends of support post 29, such posts may be completely removed from the apparatus, and the front end of the cotton harvester may thus be detached from the tractor. Similarly, removal of the bolts 21ᵃ will detach the rear end of the cotton harvester unit from the tractor.

To support the cotton harvester unit during the attachment or detachment procedure, a pair of support frames or blocks 105 may be provided to respectively engage the extreme ends of the rear transverse beam 20. The support frames 105 are preferably of slightly greater height than the normal displacement of the transverse beam 20 with respect to the ground so that it is necessary to jack the beam 20 upwardly a slight amount to permit the insertion of the support frames 105 thereunder. When detaching, a jack may be used to lower the beam 20 onto support frames 105.

To support the front end of the frame structure 27, this invention provides a pair of auxiliary support posts 30, each having a pair of brackets 30$^a$ at its top end spaced to surround the underside of front transverse beam 28 and to be pivotally secured thereto on a longitudinal axis by a pin 35 traversing a suitable longitudinal hole in beam 28. The plate 28$^a$, which is welded across the bottom of channel beam 28, is contacted by a support web 37 welded between brackets 30$^a$. The bottom ends of posts 30 are provided with arcuately-shaped ground-engaging shoes 31, and the overall length of the posts 30 is in excess of the normal height of the front transverse beam 28 with respect to the ground so that posts 30 are initially assembled to the beam 28 while occupying an inclined position with respect to the vertical end, then the bottom ends of such support posts are respectively swung laterally inwardly toward the tractor until firm ground engagement is obtained, and hence the weight of the cotton harvester unit is assumed by the ground-engaging posts 30 and removed from the tractor mounting posts 29. Alternatively, a jack 39 may be engaged under a projection 38 on post 30 to take up the weight of the frame structure. The posts 29 can then be conveniently removed from their bolted assembly with the tractor, and the cotton harvester unit and the tractor may be driven forwardly out from under the cotton harvester unit.

Assemblage of the cotton harvester unit to the tractor is obviously accomplished by reversing the above-described procedure.

If desired, the support posts 30 may incorporate means for adjusting the length thereof, for example, the ground-engaging shoes 31 may be secured to the ends of a rod 31$^a$ which is snugly insertable within the support post 30, and the effective length of the support post 30 may then be determined by selective insertion of a bolt 31$^b$ through one of a plurality of holes 30$^c$ provided in the support posts and cooperating holes 31$^c$ provided in the rod portion.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. Crop harvester frame structure for drive-in and drive-out mounting on and dismounting from an agricultural tractor of the type having large diameter, laterally spaced rear wheels, a relatively narrow forwardly projecting engine housing and an operator's position intermediate said rear wheels and engine housing; comprising a rear transverse beam adapted to extend transversely across the tractor rearwardly of said tractor rear wheels and to project laterally beyond one side of the tractor, a pair of laterally spaced, forwardly projecting beams secured to said transverse beam and adapted for securement to the tractor rear axle housing intermediate said wheels, bracket means on the laterally projecting portion of said rear transverse beam for mounting the crop contacting portions of the harvester in forwardly projecting relationship, a pair of generally upright elements respectively secured to and projecting upwardly from said forwardly projecting beams, a forward transverse beam adapted to overlie the front end of the tractor, articulated framing members interconnecting said forward transverse beam and said upright elements to define a crop collecting basket support frame adapted to be located entirely above said engine housing and operator's position, a pair of vertical support columns detachably secured to laterally spaced points on said forward transverse beam in depending relationship thereto and adapted to be disposed on opposite sides of the tractor engine housing, means on the lower ends of said vertical support columns for detachably securing said vertical support colums to the tractor, and a pair of ground engaging support posts, means for respectively attaching said posts to the lateral ends of said forward transverse beam so that said posts are adapted to project laterally and downwardly beyond each side of the tractor to support the front end of the crop harvester during mounting on and dismounting from the tractor, whereby said tractor may be backed into said frame structure for mounting of the harvester and driven forwardly out of said frame structure for dismounting.

2. The combination defined in claim 1, wherein said ground-engaging support posts are respectively pivotally attached to said forward transverse beam on longitudinal axes, thereby permitting swinging the bottom portions of said ground-engaging support posts toward the tractor side to transfer the load on said vertical support columns to said ground-engaging posts to permit disconnection of said vertical support columns from the tractor.

3. Crop harvester frame structure for drive-in and drive-out mounting on and dismounting from an agricultural tractor of the type having large diameter, laterally spaced rear wheels, a relatively narrow forwardly projecting engine housing and an operator's position intermediate said rear wheels and engine housing; comprising a rear transverse beam adapted to extend transversely across the tractor rearwardly of said tractor rear wheels and to project laterally beyond one side of the tractor, a pair of laterally spaced, forwardly projecting beams secured to said transverse beam and adapted for securement to the tractor rear axle housing intermediate said wheels, means on the laterally projecting portion of said rear transverse beam for mounting the crop contacting portions of the harvester thereon, an upwardly projecting structure rigidly mounted with respect to said rear transverse beam and said forwardly projecting beams, forwardly projecting framing members connected to the upper portions of said upwardly projecting structure and defining a crop collecting basket support frame adapted to be located entirely above said engine housing and operator's position, said basket support frame including a forward transverse beam adapted to overlie the front end of the tractor, a vertical support structure secured to said forward transverse beam in depending relationship thereto and having laterally spaced columns adapted to be disposed on opposite sides of the tractor engine housing, means on the lower ends of said vertical support columns for detachably securing said vertical support columns to the tractor, a pair of ground-engaging support posts and means for respectively attaching said posts to the lateral ends of said forward transverse beam so that said posts are adapted to project laterally and downwardly beyond each side of the tractor to support the front portions of the crop harvester frame during mounting on and dismounting from the tractor, whereby said tractor may be backed into said frame structure for mounting of the harvester and driven forwardly out of said frame structure for dismounting.

References Cited in the file of this patent

UNITED STATES PATENTS 2,719,394    Thomann et al.            Oct. 4, 1955